(12) United States Patent
Pan et al.

(10) Patent No.: US 12,465,890 B2
(45) Date of Patent: Nov. 11, 2025

(54) DIGITAL SEAWATER PROCESSING

(71) Applicant: Schlumberger Technology Corporation, Sugar Land, TX (US)

(72) Inventors: Shu Pan, Houston, TX (US); Oleg O. Medvedev, Missouri City, TX (US); Robert Charles William Weston, Berkshire (GB); Marcus Suzart Ungaretti Rossi, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 137 days.

(21) Appl. No.: 17/602,298

(22) PCT Filed: Apr. 23, 2020

(86) PCT No.: PCT/US2020/029445
§ 371 (c)(1),
(2) Date: Oct. 8, 2021

(87) PCT Pub. No.: WO2020/219626
PCT Pub. Date: Oct. 29, 2020

(65) Prior Publication Data
US 2022/0161193 A1  May 26, 2022

Related U.S. Application Data

(60) Provisional application No. 62/837,910, filed on Apr. 24, 2019.

(51) Int. Cl.
*B01D 61/12* (2006.01)
*B01D 65/02* (2006.01)
(Continued)

(52) U.S. Cl.
CPC ............ *B01D 61/12* (2013.01); *B01D 65/02* (2013.01); *C02F 1/442* (2013.01); *C02F 1/444* (2013.01);
(Continued)

(58) Field of Classification Search
CPC .... B01D 61/12; B01D 65/02; B01D 2321/40; B01D 2315/20; B01D 2321/16;
(Continued)

(56) References Cited

U.S. PATENT DOCUMENTS 6,190,556 B1  2/2001  Uhlinger
2008/0082181 A1  4/2008  Miller et al.
(Continued)

FOREIGN PATENT DOCUMENTS

WO  2010109265 A1  9/2010
WO  2012081746 A1  6/2012
(Continued)

OTHER PUBLICATIONS

Hagawa, WO2018026020 A1, English machine translation (Year: 2018).*
(Continued)

*Primary Examiner* — Hayden Brewster
(74) *Attorney, Agent, or Firm* — Jeffrey D. Frantz

(57) ABSTRACT

Methods of operating membrane processes, such as seawater purification processes, are described herein. The methods generally include flowing seawater into a membrane purification process; recovering purified seawater and concentrated seawater from the membrane purification process; sensing operating parameters of the membrane purification process; determining a state of the membrane purification process from the operating parameters using a physical model; using a statistical model to resolve a time dependence of the state of the membrane purification process;
(Continued)

using a recursive statistical process to update the statistical model; using the updated statistical model to predict a future state of the membrane purification process; comparing the predicted future state of the membrane purification process to a threshold state; and predicting a remaining time before the membrane purification process reaches the threshold state.

20 Claims, 3 Drawing Sheets

(51) Int. Cl.
*C02F 1/44* (2023.01)
*C02F 103/08* (2006.01)

(52) U.S. Cl.
CPC ...... *B01D 2321/16* (2013.01); *B01D 2321/40* (2013.01); *C02F 2103/08* (2013.01); *C02F 2209/40* (2013.01)

(58) Field of Classification Search
CPC ......... B01D 61/22; B01D 65/08; C02F 1/442; C02F 1/444; C02F 2103/08; C02F 2209/40; C02F 1/32; C02F 1/78; C02F 2303/22

See application file for complete search history.

(56) References Cited

U.S. PATENT DOCUMENTS

| | | | |
|---|---|---|---|
| 2016/0046503 A1* | 2/2016 | Hoek | B01D 61/22 |
| | | | 210/741 |
| 2018/0072588 A1 | 3/2018 | Kim et al. | |
| 2019/0184343 A1* | 6/2019 | Hagawa | B01D 65/02 |

FOREIGN PATENT DOCUMENTS

| | | | | |
|---|---|---|---|---|
| WO | WO-2018026020 A1 * | 2/2018 | ............ | B01D 61/22 |
| WO | 2020023955 A1 | 1/2020 | | |
| WO | 2020023956 A1 | 1/2020 | | |

OTHER PUBLICATIONS

Lee, WO2012081746 A1, English machine translation (Year: 2012).*
International Search Report and Written Opinion issued in the related PCT application PCT/US2020/029445, dated Aug. 12, 2020 (12 pages).

* cited by examiner

DIGITAL SEAWATER PROCESSING

CROSS-REFERENCE TO RELATED APPLICATION

The present document is a National Stage Entry of International Application No.: PCT/US2020/029445, filed Apr. 23, 2020, which is based on and claims priority to U.S. Provisional Application Ser. No. 62/837,910, filed Apr. 24, 2019, which is incorporated herein by reference in its entirety.

FIELD

Embodiments described herein generally relate to operation of membrane separation processes. Specifically, this application describes advanced control and operation of seawater purification processes that are applicable to any membrane separation process.

BACKGROUND

Membrane processes are common in the process industries. Membranes are commonly used to separate materials according to differential permeability. As the membranes filter material, a portion typically permeates the membrane and a portion does not permeate the membrane. Over time, the membrane surface can become coated, fouled, or otherwise impacted by collection of material on the surface leading to declining separation efficiency of the membrane, chiefly due to reduced permeability. Chemical treatments can be used to reduce fouling or membranes. In some cases, continuous dosing can lengthen the time between membrane cleanings. Additionally, some membranes have specific materials to do specific filtrations, and those materials may be sensitive to certain components. Chemical treatments can be used to neutralize the components that can damage membrane chemistries. The chemicals often improve membrane performance up to a point, and degrade performance above that point. Moreover, that point can change over time as a membrane ages.

One area where membrane separation is used is in seawater processing. The seawater may have been subjected to an extraction process of some kind, such as hydrocarbon or metal extraction, or it may be desired to increase purity of the seawater toward a drinkable state. In one case, membranes are used to remove certain components from seawater. For example membrane filters can remove suspended solids and/or sulfates from the seawater. In some cases, the membranes are sensitive to some components in the seawater, such as chlorides. In such cases, chemical treatment is often used to remove the components giving rise to the sensitivity. In addition, chemical treatments can be used to remove filtered material from the membranes. In many cases, continuous chemical treatment is employed, both to remove sensitive components and to clean membranes. Managing the operation of such processes is sensitive to changing environmental conditions, including composition of the seawater, ambient temperature, and temperature of the seawater, among others. Chemicals can be wasted, and membranes damaged by incorrect administration of chemicals. Methods and systems for managing membrane processes are needed.

SUMMARY

Embodiments described herein provide a method, comprising flowing seawater into a membrane purification process; recovering purified seawater and concentrated seawater from the membrane purification process; sensing operating parameters of the membrane purification process; determining a state of the membrane purification process from the operating parameters using a physical model; using a statistical model to resolve a time dependence of the state of the membrane purification process; using a recursive statistical process to update the statistical model; using the updated statistical model to predict a future state of the membrane purification process; comparing the predicted future state of the membrane purification process to a threshold state; and predicting a remaining time before the membrane purification process reaches the threshold state.

Other embodiments described herein provide a method, comprising flowing seawater into a membrane purification process; recovering purified seawater and concentrated seawater from the membrane purification process; sensing operating parameters of the membrane purification process; determining a state of the membrane purification process from the operating parameters using a physical model; using a statistical model to resolve a time dependence of the state of the membrane purification process; using a recursive statistical process to update the statistical model; using the updated statistical model to predict a future state of the membrane purification process; comparing the predicted future state of the membrane purification process to a threshold state; predicting a remaining time before the membrane purification process reaches the threshold state; and adjusting a flow rate of chemical treatment to a membrane of the membrane purification process based on the remaining time.

Other embodiments provide a method, comprising flowing seawater into a membrane purification process; recovering purified seawater and concentrated seawater from the membrane purification process; sensing operating parameters of the membrane purification process; determining a state of the membrane purification process from the operating parameters using a linear physical model; using an exponential statistical model to resolve a time dependence of the state of the membrane purification process; using a Bayesian recursive statistical process to update the exponential statistical model; using the updated exponential statistical model to predict a future state of the membrane purification process; comparing the predicted future state of the membrane purification process to a threshold state; predicting a remaining time before the membrane purification process reaches the threshold state; and adjusting a flow rate of chemical treatment to a membrane of the membrane purification process based on the remaining time.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
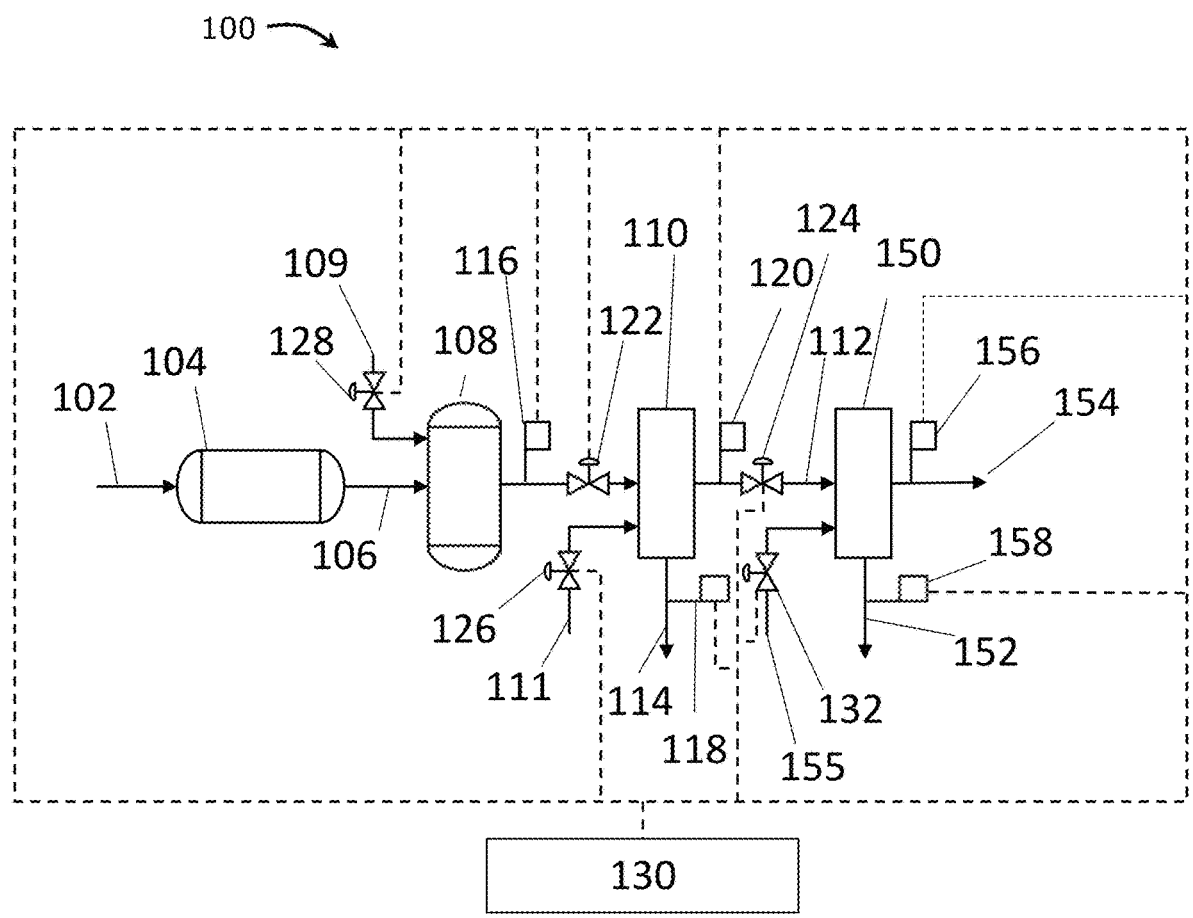
FIG. 1 is a process diagram of an apparatus according to one embodiment.

FIG. 1 is a process flow diagram of a seawater processing facility 100 according to one embodiment. The seawater processing facility 100 has a seawater input 102 to an initial coarse separation vessel 104, where any large solids are settled, strained, or otherwise removed. An initially purified seawater stream 106 is output from the initial settling vessel 104 to a chemical treatment unit 108. The chemical treatment unit 108 adds a chemical treatment 109 to the seawater to remove any components that may cause problems downstream. For example, in this process there will be membrane filtration units downstream, which can be damaged by bacteria and/or specific ions in the seawater, for example by fouling the membranes. The chemical treatment unit 108 can add chemicals to remove or manage these. For example, hypochlorite, chlorinated isocyanurates, ozone, and/or other biocides can be added to remove or neutralize bacteria. UV treatment can also be used to control bacteria. Ferric chloride can be used to collect particles. Bisulphite can remove chlorine. Scale inhibitors can be used to minimize formation of scale on membranes. Application of any of the above chemicals can be continuous for a period of time or intermittent. Flow rate of the chemical treatment 109 can be controlled using flow controller 128.

Chemically treated seawater is routed to a first membrane unit 110. The first membrane unit 110 filters impurities from the seawater. The first membrane unit may be one or more ultrafiltration units, nanofiltration units, or a combination thereof, arranged in any convenient series, parallel, or combination arrangement. A first permeate stream 112 is a single permeate stream for one membrane or a combination of permeate streams for a plurality of membranes. A first reject stream 114 is a single reject stream for one membrane or a combination of reject streams for a plurality of membranes. The membrane or membranes of the first membrane unit 110 can collect foulants, reducing membrane performance, or potentially making the membranes unusable, after a period of operation. To prolong operation of the membranes before the membranes become inoperable due to fouling or other occlusion, the membrane can be flushed with a first cleaning treatment 111, intermittently or continuously, to remove foulants. Here, the first cleaning treatment 111 is represented as a single stream, but may be multiple streams with individual flow control if the first membrane unit 110 has multiple membranes. The first cleaning treatment 111 can be added to the first membrane unit 110 at a location upstream of the first membrane unit 110, such that the first cleaning treatment 111 encounters one or more membrane surfaces and at least partially removes foulants. Flow rate of the first cleaning treatment 111 to the first membrane unit 110 is controlled by first cleaning flow controller 126, which may control multiple streams of the first cleaning treatment 111.

Temperatures and pressures can be measured at the input to the first membrane unit 110, and on the first reject and permeate streams 114 and 112. Flow rates of each stream can also be measured. Purity, and impurity content, of any or all of the streams can also be measured. From this information, various methods can be used to infer specific permeabilities of the first membrane unit 110. An inlet sensor cluster 116 measures parameters of the inlet stream. A first reject sensor cluster 118 measures parameters of the first reject stream 114. A first permeate sensor cluster 120 measures parameters of the permeate stream 112. Each sensor cluster includes temperature, pressure, and flow sensors. In addition, the first permeate sensor cluster 120, and one or more of the inlet and first reject sensor clusters 116 and 118, include composition sensors. The first permeate and reject sensor clusters 120 and 118 may include multiple sensor clusters for multiple permeate and reject streams where the first membrane unit 110 includes multiple membranes. An inlet flow controller 122 controls flow of the inlet stream to the first membrane unit 110. A controller 130 is operatively coupled to the inlet sensor cluster 116, the first permeate sensor cluster 120, and the first reject sensor cluster 118 to receive signals, from the sensor clusters, that represent the physical quantities sensed by the various sensors of each cluster. The controller interprets the signals to resolve estimates of temperature, pressure, flow rate, and composition, as may be relevant to each sensor cluster.

The first permeate stream 112 is routed to a second membrane unit 150 that removes different impurities from the first permeate stream 112. The second membrane unit 150 features one or more sulfate removal membranes, and may also feature ultrafiltration and/or nanofiltration membranes. A second reject stream 152 and a second permeate stream 154 are output from the second membrane unit 150. The second membrane unit 150 may include multiple membranes in any operative relationship. A second permeate sensor cluster 156 senses conditions (temperature, pressure, composition) of the second permeate stream 154, and a second rejection sensor cluster 158 senses conditions (temperature, pressure, optionally composition) of the second reject stream 152. Each sensor cluster 156 and 158 is operatively coupled to the controller 130, such that the controller 130 receives signals from the sensor clusters 156 and 158 representing physical parameters of the respective second permeate and reject streams 154 and 152 and interprets the signals to resolve the physical parameters sensed by the sensor clusters. The second permeate stream 154 is a purified seawater stream that can be routed to subsequent processing.

A second cleaning treatment 155 is coupled to the second membrane unit 150, with flow controlled by flow controller 132. Each of the first and second cleaning treatments 111 and 155 can include more than one chemical to improve membrane performance. Any number of membranes can be arranged in a processing facility, or in a plurality of processing facilities. If each membrane is provided a chemical treatment, the chemical treatment of each membrane can be controlled based on the membrane performance indicated by the sensor clusters. As with the first membrane unit, the second membrane unit may feature multiple permeate and reject streams that are combined, and the sensor clusters may include multiple sensors for the multiple permeate and reject streams. Additionally, the second cleaning treatment 155 may be multiple streams, each with individual flow control, where the second membrane unit 150 includes multiple membranes.

A controller 130 is operatively coupled to the control valves 122, 124, 126, 128, and 132, and to the sensor clusters 116, 118, 120, 156, and 158, to control the membrane process. The controller 130 receives signals from the sensor clusters 116, 118, 120, 156, and 158 representing temperature, pressure, and composition, and resolves those operating parameters from the signals. The controller 130 also sends control signals to the control valves 122, 124, 126, 128, and 132 based on the signals from the sensor clusters and, optionally, from other computing instances, to control the membrane process.

The flow of any component through a membrane, or indeed any medium, is proportional to the pressure drop across the membrane.

$$q = k(\Delta p - \Delta \pi).$$

The proportionality constant k is the permeability of the membrane with respect to the permeate species. The permeability can be decomposed into an intrinsic permeability $\kappa$, a temperature compensation $\theta(T)$ and a fouling factor $\varphi$. The temperature compensation factor rises with temperature to reflect increasing permeability with temperature, and may be different for different components of the feed stream. The fouling factor $\varphi$ declines with decreasing permeability, and may have different behavior for different components of the feed stream. Thus, for the full equation, $$q = \kappa \theta(T) \varphi (\Delta p - \Delta \pi)$$

gives the permeate flow rate taking temperature and fouling into account. Here, $\Delta p$ is the average pressure drop across the membrane, $$\Delta p = \frac{P_f + P_r}{2} - P_p$$

where $P_f$ is feed pressure, $P_r$ is reject stream pressure, and $P_p$ is permeate stream pressure. The osmotic pressure drop can be represented as follows:

$$\Delta \pi = \pi_p - \pi = [-1.12(273+T)\Sigma m_f] \left[ \frac{2C_p + e^{.7Y}C_f + e^{.7Y}C_c}{2C_f} \right]$$

according to one model. In this model, $m_f$ is molal concentration of ion species in the feed, and $C_p$, $C_f$ and $C_c$ are salt concentrations in the permeate, feed, and concentrate (reject) streams, respectively. Thus, we can compute a fouling factor from process observations, as follows:

$$\varphi = \frac{q}{\kappa \theta (\Delta p - \Delta \pi)}$$

where $\kappa$ is a constant, $\Delta p$ is computed from process pressures, and $\Delta \pi$ is computed from process temperatures and compositions. In the equations above, Y is the recovery of permeate from feed, permeate flow rate divided by feed flow rate. The temperature correction $\theta$ can be computed, in one model, as follows:

$$\theta(T) = e^{A\left(\frac{1}{298} - \frac{1}{273+T}\right)}$$

where A is 2640 if T≥25° C. and 3020 if T<25° C. With the sensor clusters 116, 118, 120, 156, and 158 returning temperatures, pressures, flow rates, and compositions, the equations above can be used to compute the fouling factor with each reading from the sensor clusters. Concentration in the permeate stream, for example of salt, can be estimated, if sensor accuracy is insufficient, as follows:

$$C_p = \frac{BS\theta(T)(C_f + C_r)}{2Q}$$

where B is the mass transfer coefficient of the solute in question.

Flow rates, temperatures, pressures, and compositions are archived in time series, typically in a digital processing system that may be local to one membrane, centralized at one processing facility, or remotely integrating multiple processing facilities. The physical data is stored with time stamp so that time-dependent analysis can be done. Using the above equations, fouling factors and/or fouling factor parameters, can be computed for each historical data vector. Fouling factors can be related to time according to any convenient model. Linear models, power models, hyperbolic models, and exponential models, and combinations thereof, can be used. To wit, fouling factor may be computed according to any of the following:

$$\varphi_1 = 1 - a_1 t \quad (1)$$

$$\ln(\varphi_2) = 1 - a_2 t \quad (2)$$

$$\varphi_3 = 1 - \Sigma A_i t^i \quad (3)$$

$$\varphi_4 = \frac{a_4}{t} \quad (4)$$

$$\varphi = \Sigma \psi_i \varphi_i \quad (5)$$

Other models, such as compositions of the simple functions above, and piecewise models can also be used. Supervised and unsupervised machine learning algorithms, such as artificial neural networks, can be used to determine the best form and fit of model to historical data. The machine learning system determines a model that predicts fouling factor as a function of time by fitting and/or combining mathematical operations to historical fouling factor data. Parameters of time-dependence are determined from the fit, and dependence on other factors may also be ascertained by machine learning techniques. For example, fouling factor may decline more rapidly with time under certain circumstances, like low temperature or high concentration, than in other circumstances. In any case, historical fouling factors can be computed from the physical equations above, and the decay parameters and combination parameters, if any, can be determined from statistical treatment. The fouling factor, or membrane performance based on the fouling factor, can be projected into the future to determine when membrane performance will reach a critical point at which some intervention is needed. To wit, if fouling factor at an end point is $\varphi_\Omega$, remaining useful life of the membrane can be computed by finding the zero of $\varphi(t) - \varphi_\Omega$.

If remaining useful life of a membrane is computed on successive occasions, chemical treatment can be adjusted according to movement in the remaining useful life. For example, if remaining useful life declines by more than time elapsed since the last determination of remaining useful life, chemical treatment can be increased to intensify fouling remediation. If remaining useful life increases, chemical treatment can be diminished to save cost. Regression, or principal component analysis, can be used to determine, from historical data, which combination of measures most affect the remaining useful life of a membrane. In a dataset of flowrates, temperatures, and pressures for a membrane operation, standard transformations can be applied to specific dimensions of the dataset, and regression or principle component analysis can be performed to determine any unknown strong relationships in the dataset, and those relationships can be used to construct control algorithms.

Figure 2:
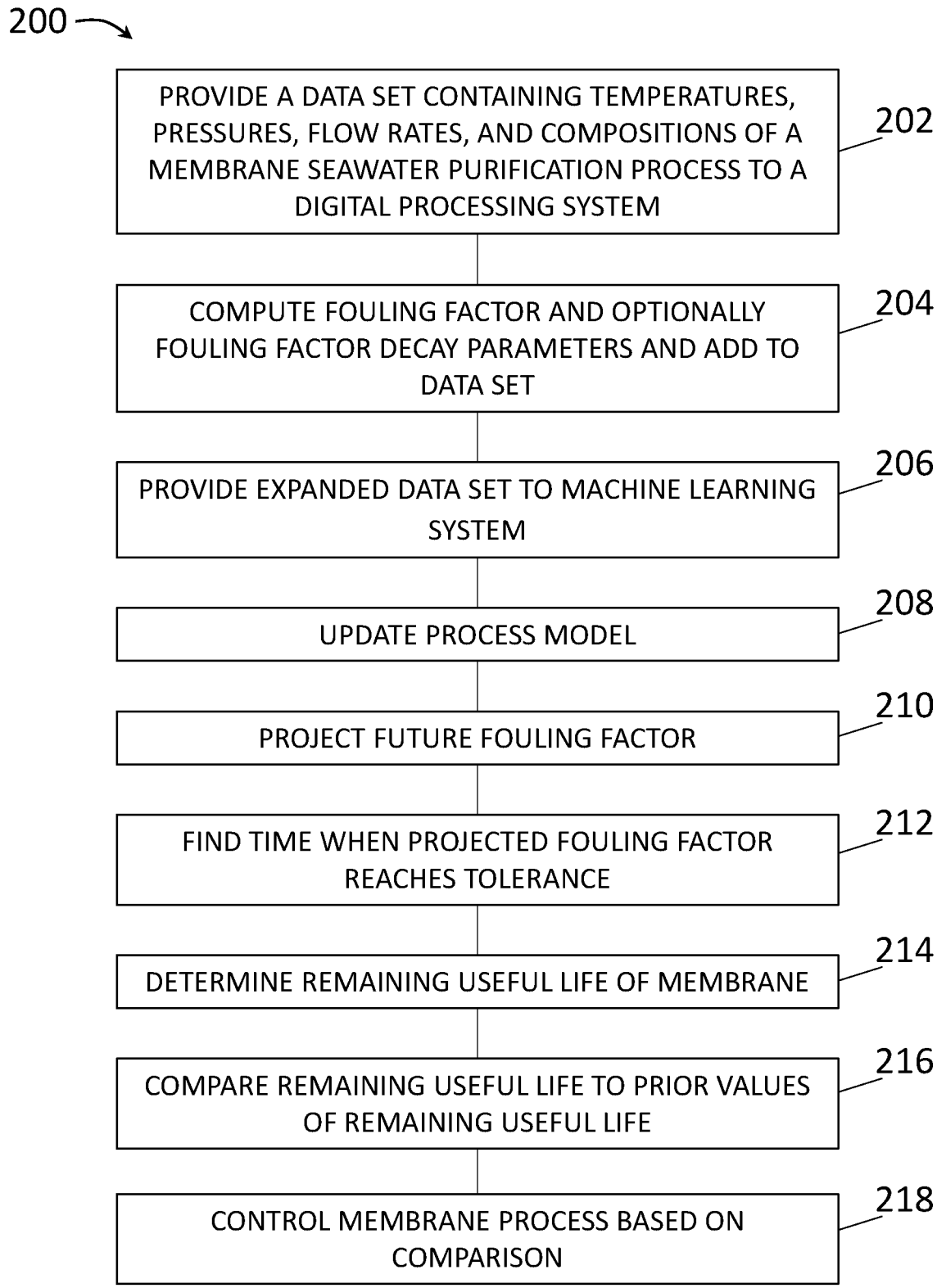
FIG. 2 is a process diagram of an apparatus according to another embodiment.

FIG. 2 is a flow diagram summarizing a method 200 according to an embodiment. The method 200 is a method of operating a membrane seawater purification process. At 202, a dataset containing operating parameters—temperatures, pressures, flowrates, and compositions—of the membranes of the seawater purification process is provided to a digital processing system, for example by a controller like the controller 130 of FIG. 1 receiving signals from sensor clusters such as the sensor clusters 116, 118, 120, 156, and 158. At 204, fouling factors, and optionally fouling factor decay parameters, are computed by the digital processing system for each grouping of temperature, pressure, flow rate, and composition, based on the operating parameters using, for example, the equations above, and added to the dataset. At 206, the expanded dataset is provided to a machine learning system to determine patterns in the dataset. The machine learning system maintains a model of the dataset. The dataset includes a plurality of parameters that are measured and calculated, and that represent operation of the seawater purification process. The parameters include temperatures, pressures, flow rates, and compositions, and may include fouling factors calculated from the primary parameters. The model may include the same parameters as the dataset. Alternately, the model may include only principle components of the dataset after performing principle component analysis on the dataset. In this case, the dataset may be transformed to the principle component basis.

It should be noted that historical fouling factors and decay parameters need only be computed once and stored with the historical process observations. It is not necessary to recompute historical fouling factors from process observations every time the method 200 is practiced, provided the historical fouling factors are available in the dataset.

The dataset typically contains a temperature for each membrane in the facility, a pressure for feed, permeate, and reject streams of each membrane in the facility, flow rates of feed, permeate, and reject streams for each membrane, and compositions of feed and at least one of permeate and reject for each membrane. The dataset also contains chemical treatment flow rates for each membrane. These parameters constitute the parameter vector. In the event the dataset is transformed to a principal component basis, a reduced parameter vector may be used. The model is typically based on the same parameter vector or reduced parameter vector.

Each entry in the model is a calculation based on data in the dataset, and potentially on prior model results. Thus, each entry of the model is based on prior entries in the dataset and the model. The function of each model is built from one or more mathematical operations selected based on the type of model desired. The model, in this case, resides in the machine learning system, and is a machine learning model that seeks the best calculation of each parameter based on the prior data. During each iteration of the model, a plurality of candidate values of each parameter is calculated from a plurality of functions. These functions may be simple individual functions or may be combinations of functions. A library of functions, such as linear, exponential, periodic, logistic, statistical, and other functions can be maintained and permuted over the parameter vector. Each function can also be combined with the other functions by a list of defined operators such as addition, multiplication, convolution, etc., and the model may be configured to permute combinations of functions and operators in seeking the best mathematical representation of the historical data.

The data in the database may update on different schedules. The data is typically aggregated by a controller configured to collect data from the processing facility and to send control signals to controlled units of the processing facility. For example, the controller may receive an updated value of a first parameter, such as a temperature, after a first duration while a second parameter, such as a flow rate, may update after a second duration different from the first duration. Thus, a record in the dataset may have only one updated parameter value, more than one updated parameter value, or all parameters may have updated values. In order to compute a model entry for the same time stamp, input processing may be needed to build an input dataset for the model. The controller may perform the input processing before invoking the machine learning system, or an input processor may receive data from the controller, prepare input for the machine learning system, and send the input to the machine learning system. If the model is configured to accept a vector of parameter values as input, the input vector can be built from the dataset in any convenient way. For example, the last three available values of each parameter can be averaged, or the last available value of each parameter can be used to form the input vector. If the model is configured to accept a time-series dataset, the dataset can be regularized by filling in any missing values in the time series by any convenient means.

At 208, the machine learning system updates a process model using the new data. Parameters of the model are re-computed based on the new data, and statistical methods are applied to determine the best model parameters given the new data. When the machine learning system converges on new model parameters, the old model parameters are replaced with the new model parameters. The old model parameters may be archived for trend analysis, if desired. For each model parameter, the machine learning system seeks the best mathematical representation of the parameter dependence on time or any other variable. Any suitable data mining technique can be used to determine the best result. The machine learning system may rebuild each predictive function of the model from the ground up every cycle, or may check the validity of the current model using the new data and compare the result to a tolerance to determine whether to keep, update, or rebuild each function. Alternately, the predictive functions may be configured to update on individual schedules such that before its scheduled update time a predictive function will not be updated. In such cases, when an update time for a predictive function arrives, more than one new data record may be available to update the predictive function. The machine learning system may be configured to run update cycles periodically and update those predictive functions whose scheduled update times have arrived, or who are not configured with a schedule. Alternately, each time a scheduled update time for a predictive function arrives, the machine learning system may update that predictive function.

At 210, the machine learning system projects the future evolution of fouling factors for every membrane in the processing facility. The projection may be strictly linear, or may be based on the current model or a combination of current and prior models, potentially weighted according to antiquity.

At 212, the machine learning system determines a time when the future projection of fouling factors for each membrane reaches the tolerance point for membrane fouling factor.

At 214, the machine learning system computes remaining useful life for each membrane. Current time is subtracted from the future time at which the model determined the fouling factor for each membrane will reach the tolerance point.

At 216, the computed remaining useful life is compared to prior calculated remaining useful life instances. This activity may be done by the controller or by the machine learning system. In any event, a controlled variable, or plurality of controlled variables, is selected to adjust based on the comparison. A threshold value may be applied to determine whether to change any controlled variables. For example, if the change in remaining useful life of a membrane is substantially equal to the elapsed time between model iterations, the threshold value may preclude changing any controlled variable.

If conditions are met to change a controlled variable to manage fouling factors of any membranes, the fouling factor model function may be used to determine a controlled variable, or plurality of controlled variables, that have the greatest effect on fouling factor. For example, the machine learning system or the controller may be configured to differentiate the fouling factor model function and select those controlled variables that impact fouling factor more than a threshold amount.

At 218, one or more controlled variables of the processing facility, such as flow rate of chemical treatments, temperature, and/or flow rate of feed and permeate streams, is adjusted to beneficially impact fouling factor of one or more membranes. The controlled variables may be those determined above in connection with operation 216 to have the most impact on fouling factor. The fouling factor model function may be used to compute changes to the controlled variables. A constrained optimization may be performed, based on the current values of the controlled variables and any limits thereof, to define new set points for the controlled variables that achieve a predetermined change in fouling factor for the membrane. The controlled variables may be adjusted in inverse relation to the remaining time before the process reaches the threshold condition. For example, an adjustment amount to one or more controlled variables may be computed as an inverse proportion to the remaining time. Other inverse relations can be designed by skilled artisans.

The method 200 may be performed locally by a digital processing system located at the processing facility where the membrane in question operates, either in a control center or a computing center of the processing facility, or the method 200 may be performed by a combination of local and remote units. For example, the machine learning system may be remote, and may perform machine learning functions for a plurality of processing facilities.

The machine learning system may be a neural network type system. In a neural network type system, a plurality of calculations are performed to define a model relating variables. Here, the neural network can relate process observations such as temperature, pressure, flow rate, and composition, and equipment parameters such as thickness, flow area, surface area, and porosity, to process performance variable such as fouling factor. The calculations can be arranged as nodes, or simulating nodes, in a neural network, where each node is a calculation that predicts a set of variables from another set of variables. The calculations can all be based on the same mathematical form, such as exponential, logarithmic, linear, polynomial, power law, etc., or any distribution of mathematical forms can be used in the calculations. The mathematical forms are driven by one or more parameters or coefficients, and may be combined using one or more combination parameters. To wit, in one topology, each node will compute a model, as follows:

$$f_i(x) = g_1(x) \square g_2(x) \square g_3(x) \ldots \square g_n(x)$$

where $\square$ represents any mathematical operation to combine the mathematical forms $g_j(x)$. The forms $g_j(x)$ each include parameters $\gamma$ the operator $\square$ can also include combination parameters $\alpha$. The input vector x in this case is the history of process observations and equipment parameters, or a subset thereof, and the output can be one or more predicted quantities, which may be predictions of certain process attributes. For example, the model may predict permeate flow rate and/or composition, or the model may predict fouling factors and/or fouling factor decay parameters. In other cases, the model may predict improvement in process performance due to chemical flush, if attributes of the chemical flush are included in the input vector.

In the topology above, where each calculation node has the same objective of computing a desired output, refining nodes can synthesize the output of the calculation nodes according to a score determined for each calculation node representing a level of confidence in the result of the calculation by the calculation node. The refining node can take, as input, the output of a number of nodes and their scores, and can output a synthesized version of the calculations performed by the nodes, weighted by their respective scores, essentially providing a synthesized mathematical model.

In general, the nodes of the neural network each take a different approach to deriving a relationship between the variables in the data set, and the output of the nodes is combined and/or selected according to a metric of confidence in the result of each node's calculation and according to a combination process defined for a group of the nodes. The combination processes themselves can be nodes in the neural network, with their own confidence metrics.

In some cases, a plurality of locations may have membrane processes monitored and controlled by a neural net process, and a collective neural network may aggregate data and results from the local neural networks and produce a combined model. In this scenario, the collective neural network, and the local neural networks will have the same topology, and the collective neural network may combine the parameters of the local neural networks. The combination may be a weighted average of the parameters of the local neural networks, with weighting provided by a measure of statistical confidence, such as number of data points or other uncertainty metrics or process performance metrics.

Figure 3:
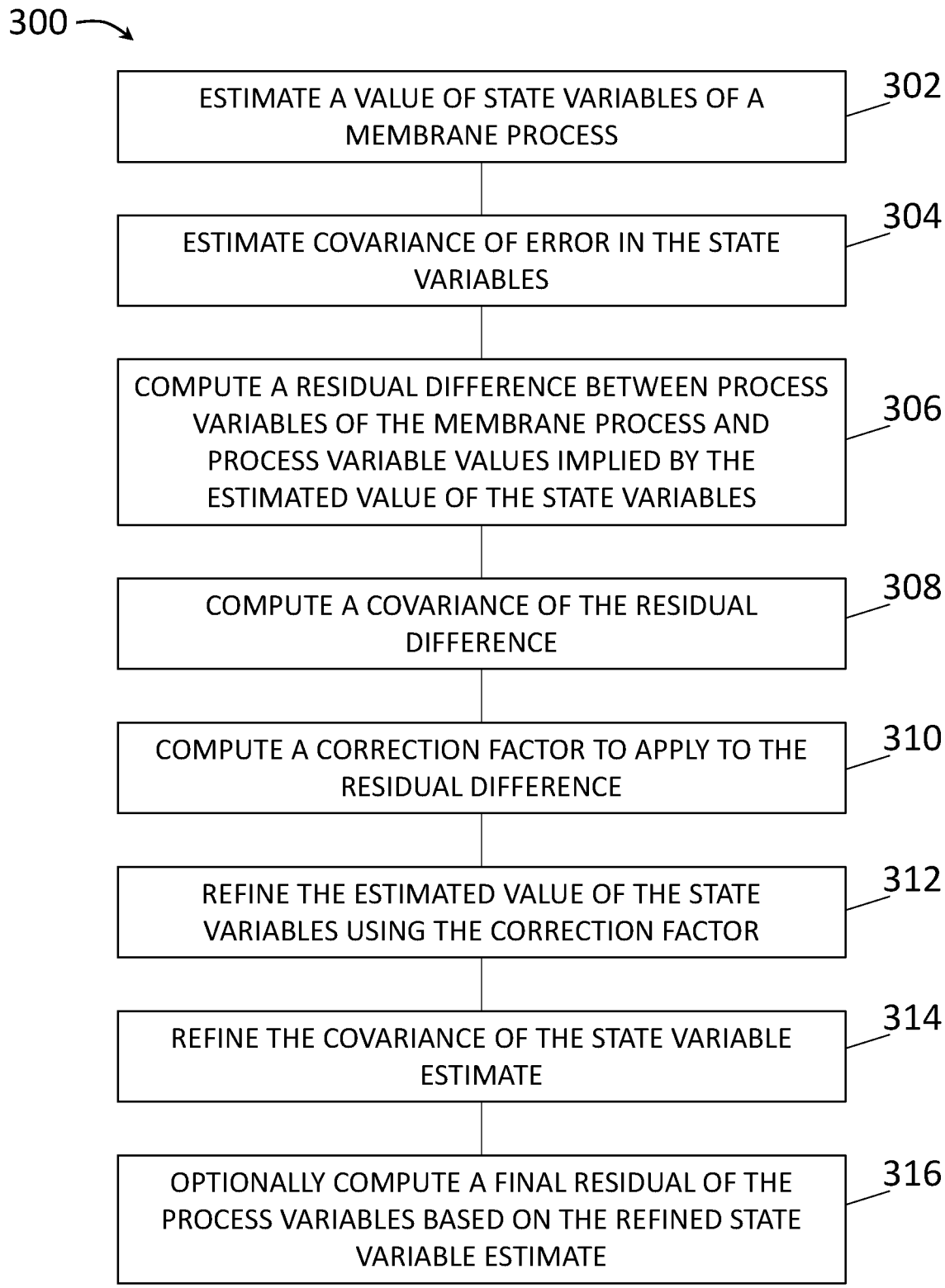
FIG. 3 is a flow diagram summarizing a method according to another embodiment.

The machine learning system described above may apply direct statistical techniques such as regression and principal component analysis. Other statistical methods can be brought to bear to improve the result by taking into account process noise, measurement noise, and other sources of uncertainty. FIG. 3 is a flow diagram summarizing a method 300 according to another embodiment. The method 300 is one way of accomplishing the update operation 208 of FIG. 2. FIG. 3 is an example of a recursive Bayesian method that can be used to effectively weight results based on noise contributions from various sources.

The method 300 will be explained using an example problem space where fouling factor of a membrane separation unit is modeled above from process observations. In the example above, fouling factor $\varphi$ is independently determined as a function of process observations temperature, pressure, flow rate, and composition, and as a function of time. There is a real fouling factor, which is not knowable with precision due to noise in the process observations. The real fouling factor, along with real decay parameters and other parameters of time dependence, constitute a state vector $\Phi=\{\varphi, a, A, \ldots\}$. Each component of the state vector $\Phi$ varies with time, so $\Phi=\Phi(t)=\{\varphi(t), a(t), A(t), \ldots\}$. For the method 300, a model exists that computes $\Phi$ at a future time. This model is a state transition function F that maps $\Phi$ from one time to another. Additionally, the membrane process described above is controlled by operation of the various control valves 122, 124, 126, 128, and 132. The method 300 generally conforms to the process of applying the Kalman filter.

At 302, a next value of the state function is estimated, as follows:

$$\Phi_t = F\Phi_{t-1} + Bu_t$$

where $u_t$ is a vector of control values most recently applied to the process (at time "t"), and B is a function that maps the control values to their impact on the state vector.

At 304, error covariance of the above estimate is also estimated. Error covariance from the prior time t−1 is projected using the same state transition function, and process noise contribution is added, as follows:

$$P_t = FP_{t-1}F^T + Q$$

It should be noted here that the state transition function, control application function, and process noise are shown as time invariant, but may vary in time, in which case these parameters in the above equations will have values at the indicated times t and t−1. This is a simplifying assumption for purposes of clear explanation.

These two computed parameters are then refined based on new data obtained from the process. As noted above, fouling factor can be computed from new process observations. This computed fouling factor will be different from the estimated fouling factor in the state vector. A recursive Bayesian technique can be used to appropriately value the noise in observations and overall in the process to find the estimate of fouling factor, decay parameter, and combination factors, with highest statistical confidence.

At 306, a residual is computed that represents the difference between the detected process observations and process observations implied by the predicted state vector. The computation is as follows:

$$y_t = z_t - H\Phi_t$$

Where $z_t$ is a vector of the latest process observations (temperature, pressure, flow rate, composition) and H is a function that maps (reverse-maps) the state vector to process observations. As the state vector includes the fouling factor, along with decay parameters and combination parameters that might not be observed to depend on process observations. Thus, H may have only one non-zero row.

At 308, covariance of the above residual is computed, as follows:

$$S_t = R + HP_tH^T$$

Here, R is covariance of the process noise Q.

A correction factor is computed at 310. The correction factor represents a treatment of residual computed above that is used to correct the prediction of the state vector. In many instances, the Kalman gain $$K_t = P_tH^TS_t^{-1}$$

is used, but other correction factors can also be used. The Kalman gain takes a ratio of the estimated state vector covariance to the residual covariance and uses the process observation reverse-mapping function to express that ratio in a form that can be used to refine the estimated state vector.

In any event, the correction factor is used to apply some weighting of the residual arising from deviation of the new process observations from the process observations that would be recorded if the estimated state vector were 100% accurate to update the estimated state vector. In this way, the estimated state vector is shifted part way toward the new process observations.

At 312, the correction factor is applied to refine the estimated state vector, as follows:

$$\Phi_t^* = \Phi_t + X_ty_t$$

where the correction factor $X_t$ can be the Kalman gain, as described above, or another convenient correction factor. The correction factor $X_t$ has the form of a linear map that transforms the residual process observations into adjustments to the components of the state vector. Of course, the correction factor $X_t$ can be a matrix of numbers, as in the Kalman gain, or may be a set of linear or non-linear functions that perform similar transformations. The correction factor can be structured to emphasize and de-emphasize any factors to any desired extent.

At 314, a refined covariance estimate of the refined state vector is computed as follows:

$$P_t^* = (I - X_tH)P_t(I - X_tH)^T + X_tRX_t^T$$

expressing that the covariance of the estimated state vector is refined essentially by applying the same correction factor to incorporate the covariance of the process noise.

Optionally, at 316, the final (refined) observation residual can be computed as follows:

$$y_t^* = z_t - H\Phi_t^*$$

in which the refined state vector is transformed into the observation space by the state vector reverse map function and compared to the latest measurements. This is the portion of those measurements that is not accounted for by the updated model.

Where non-linear state transition models (time prediction of fouling factor and decay parameters) are used, versions of the above process where the state transition function is locally linearized, like the Extended or Unscented Kalman filters, can be used. Other variations might include detection of outliers in the historical data prior to predicting, smoothing and/or dimension reduction of historical data, and time weighting or bookending the historical data. For example, when forming or updating the statistical model of time-dependent state variables, data older than a predetermined threshold may be ignored. Alternately, contribution of the data to the statistical analysis may be weighted by time. If, for example, equation (4) above is used to fit historical fouling factors to time stamps, a simple regression seeks to minimize $$\sigma^2 = \Sigma(\ln\varphi_i - at_i)^2.$$

Instead, weighting factors can be included in the objective function to de-emphasize older data. In one example, $$\sigma^2 = \Sigma \frac{(\ln\varphi_i - at_i)^2}{(t - t_i)}.$$

The quantity $(t - t_i)$ can itself be weighted to increase or reduce its effect on the regression.

The methods 200 and 300 may be practiced using observation data from different membrane processes performing generally similar separations. For example, a plurality of membrane seawater purification processes may operate at one location, or in more than one location. Each process records process observations, stores the observations locally, and has a local controller to control the process. A centrally-located digital processing system may receive process observations from all the membrane seawater purification processes into one database for processing as an aggregated data set. If the source of each data record is recorded with the data record, the modeling and prediction processes of methods 200 and 300 can be performed for the entire aggregated data set, or on subsets based on location and/or region, which can be denominated according to any geographic indicator (latitude, longitude, altitude, etc.). For example, a first statistical model can be resolved from a first subset of the aggregated data set based on a first data attribute while a second statistical model is resolved from a second substrate of the aggregated data set based on a second data attribute. The first and second data attributes can be numerical or non-numerical attributes such as latitude, longitude, altitude, ambient temperature, operating team, weather (rain, snow), static or dynamic foundation slope, variation in process parameters, staffing schedule type (number of different operating teams per day), chemical suppliers, or any conceivable attribute of the data. In this way, statistical models describing evolution of membrane process operation over time can be compared to uncover potential causes of variation in membrane life among the different processes.

It should be noted that the models described herein are models for computing and predicting fouling factors and decay parameters for membrane processing units. It is possible to use other models with recursive Bayesian techniques. For example, fouling factor data before and after a chemical flush, along with chemical flush flow rate, temperature, and time, can be provided to an artificial neural network to model the effect of chemical flush on fouling factor. In another example, fouling factor decay parameters before and after chemical flush, along with chemical flush rate, time, and temperature, can be provided to an artificial neural network to model the effect of chemical flush on fouling factor decay parameters. In such cases, a shallow neural network can be constructed in which input is fouling factor, decay parameter, and process observations immediately before and after the chemical flush, as well as the parameters of the chemical flush. Alternately, a convolutional neural network can be constructed additionally accepting as input the time-series evolution of fouling factor and membrane conditions as a two-dimensional input set. The convolutional layers of the neural network are then used to extract the spatial correlations in history of the membrane and to predict conditions for maximum effectiveness of a future chemical treatment.

While the foregoing is directed to embodiments of the present invention, other and further embodiments of the present disclosure may be devised without departing from the basic scope thereof, and the scope thereof is determined by the claims that follow.

What is claimed is:

1. A method of operating a seawater processing facility, the method comprising:
   directing a feed stream of seawater, via an inlet of a seawater processing facility, into a separation vessel configured to perform membrane purification and comprising one or more membrane units, wherein the one or more membrane units comprise one or more membrane filters;
   recovering, via the one or more membrane filters, purified seawater and concentrated seawater;
   determining, via a processor receiving sensor data from one or more sensors, operating parameters of the one or more membrane units, wherein the one or more operating parameters comprise a flow rate, a temperature, a pressure, and a composition of one or more streams associated with the one or more membrane filters;
   determining, via the processor, a fouling factor indicative of a condition of the one or more membrane filters based on the determined operating parameters, wherein the fouling factor is a function of a permeability of the one or more membrane filters, a flow across the one or more membrane filters, an average pressure drop across the one or more membrane filters, an osmotic pressure drop based on process temperatures and compositions, and a temperature correction, based on the one or more operating parameters;
   using, via the processor, a statistical model to resolve a time dependence of the condition of the one or more membrane filters;
   using, via the processor, a recursive statistical process to update the statistical model;
   using, via the processor, the updated statistical model to predict a future condition of the one or more membrane filters as a function of a future time;
   comparing, via the processor, the predicted future condition of the one or more membrane filters to a threshold condition, wherein the threshold condition indicates an end of a useful life or a point triggering an intervention;
   predicting, via the processor, a remaining time before the one or more membrane filters reaches the threshold condition, wherein the remaining time comprises a remaining useful life or time triggering the intervention; and
   adjusting, via the processor, one or more valves to change a flow rate of a chemical treatment associated with the one or more membrane filters to cause:
      an increase in the remaining time by increasing the chemical treatment in response to the remaining time decreasing by more than a time elapsed since a previous prediction of the remaining time; and
      a decrease in the remaining time by decreasing the chemical treatment in response to the remaining time increasing by more than a time elapsed since a previous prediction of the remaining time.

2. The method of claim 1, wherein the recursive statistical process uses the Kalman filter.

3. The method of claim 1, wherein the statistical model is a non-linear Bayesian process.

4. The method of claim 1, wherein adjusting, via the processor, the one or more valves comprises adjusting the flow rate of the chemical treatment to change the remaining time based on the remaining time changing by more or less than the time elapsed since the previous determination of the remaining time, and wherein adjusting the flow rate of the chemical treatment comprises computing an adjustment amount to the flow rate as an inverse relation to the remaining time and applying the adjustment amount to the flow rate of the chemical treatment.

5. The method of claim 1, wherein the statistical model is exponential.

6. The method of claim 1, wherein using a statistical model to resolve the time dependence of the condition of the one or more membrane filters comprises aggregating process observations from the one or more membrane filters and resolving the statistical model from the aggregated observations via the processor, and wherein resolving the statistical model from the aggregated observations comprises resolving a first statistical model based on a first subset of the aggregated observations based on a first attribute of the aggregated observations and a second statistical model based on a second subset of the aggregated observations based on a second attribute of the aggregated observations.

7. The method of claim 1, comprising using, via the processor, the statistical model to project a future evolution of the fouling factor over time for the one or more membrane filters.

8. The method of claim 7, comprising using, via the processor, the statistical model to determine a cause of a variation in membrane life among different processes, wherein the statistical model comprises a machine learning model.

9. A method of operating a seawater processing facility, the method comprising:
   determining, via a processor receiving sensor data from one or more sensors, operating parameters of one or more membrane units, wherein the one or more operating parameters comprise a flow rate, a temperature, a pressure, and a composition of one or more streams associated with one or more membrane filters;
   determining, via the processor, a fouling factor indicative of a condition of the one or more membrane filters based on the determined operating parameters, wherein the fouling factor is a function of a permeability of the one or more membrane filters, a flow across the one or more membrane filters, an average pressure drop across the one or more membrane filters, an osmotic pressure drop based on process temperatures and compositions, and a temperature correction, based on the one or more operating parameters;
   predicting, via the processor, a remaining time before the condition of the one or more membrane filters reaches a threshold condition, wherein the remaining time comprises a remaining useful life or time triggering an intervention; and
   adjusting, via the processor, one or more valves to change a flow rate of a chemical treatment associated with the one or more membrane filters to cause:
      an increase in the remaining time by increasing the chemical treatment in response to the remaining time decreasing by more than a time elapsed since a previous prediction of the remaining time; and
      a decrease in the remaining time by decreasing the chemical treatment in response to the remaining time increasing by more than a time elapsed since a previous prediction of the remaining time.

10. The method of claim 9, wherein the fouling factor is based on the equation:

$$\varphi = q/\kappa\theta(\Delta p - \Delta\pi)$$

wherein $\kappa$ is the permeability of the one or more membrane filters, $\Delta p$ is the average pressure drop across the one or more membrane filters, and $\Delta\pi$ is the osmotic pressure drop based on the process temperatures and compositions, $\theta$ is the temperature correction, and q is a permeate flow rate accounting for the temperature correction.

11. The method of claim 10, wherein the temperature correction is based on the equation:

$$\theta(T) = e^{A(1/298 - 1/273 + T)}$$

wherein A is 2640 if T≥25° C., and A is 3020 if T<25° C., wherein the osmotic pressure drop is based on the equation:

$$\Delta\pi = \pi_p - \pi = [-1.12(273+T)\Sigma m_f][2C_p + e^{-7Y}C_f + e^{-7Y}C_c/2C_f]$$

wherein $m_f$ is molal concentration of ion species in the feed stream, $C_f$ is a salt concentration in the feed stream, $C_p$ is a salt concentration in a permeate stream, and $C_c$ is a salt concentration in a reject stream.

12. The method of claim 9, wherein the operating parameters comprise the flow rate, the temperature, the pressure, and the composition of the one or more streams comprising each of a feed stream, a permeate stream, and a reject stream associated with the one or more membrane filters.

13. The method of claim 9, comprising:
   using, via the processor, a machine learning model to project a future evolution of the fouling factor over time for the one or more membrane filters; and
   using, via the processor, the machine learning model to determine a cause of a variation in membrane life among different processes.

14. The method of claim 1, wherein the one or more operating parameters comprise the flow rate, the temperature, the pressure, and the composition of the one or more streams comprising the feed stream, a permeate stream, and a reject stream associated with the one or more membrane filters.

15. The method of claim 1, wherein the fouling factor is based on the equation:

$$\varphi = q/\kappa\theta(\Delta p - \Delta\pi)$$

wherein $\kappa$ is the permeability of the one or more membrane filters, $\Delta p$ is the average pressure drop across the one or more membrane filters, and $\Delta\pi$ is the osmotic pressure drop based on the process temperatures and compositions, $\theta$ is the temperature correction, and q is a permeate flow rate accounting for the temperature correction.

16. The method of claim 15, wherein the temperature correction is based on the equation:

$$\theta(T) = e^{A(1/298 - 1/273 + T)}$$

wherein A is 2640 if T≥25° C., and A is 3020 if T<25° C.

17. The method of claim 15, wherein the osmotic pressure drop is based on the equation:

$$\Delta\pi = \pi_p - \pi = [-1.12(273+T)\Sigma m_f][2C_p + e^{-7Y}C_f + e^{-7Y}C_c/2C_f]$$

wherein $m_f$ is molal concentration of ion species in the feed stream, $C_f$ is a salt concentration in the feed stream, $C_p$ is a salt concentration in a permeate stream, and $C_c$ is a salt concentration in a reject stream.

18. The method of claim 1, wherein the chemical treatment comprises hypochlorite, chlorinated isocyanurates, ozone, biocides, ultraviolet (UV) treatment, ferric chloride, bisulphite, scale inhibitors, or a combination thereof.

19. The method of claim 1, wherein the future condition is based on the fouling factor.

20. The method of claim 1, wherein the remaining time, including remaining useful life, is based on the fouling factor.

* * * * *